(12) United States Patent
Kurihara et al.

(10) Patent No.: US 8,388,207 B2
(45) Date of Patent: Mar. 5, 2013

(54) ILLUMINATING DEVICE AND DISPLAY DEVICE HAVING THE SAME

(75) Inventors: Makoto Kurihara, Chiba (JP); Norihiro Dejima, Chiba (JP)

(73) Assignee: Seiko Instruments Inc. (JP)

( * ) Notice: Subject to any disclaimer, the term of this patent is extended or adjusted under 35 U.S.C. 154(b) by 724 days.

(21) Appl. No.: 12/592,864

(22) Filed: Dec. 3, 2009

(65) Prior Publication Data

US 2010/0142225 A1 Jun. 10, 2010

(30) Foreign Application Priority Data

Dec. 4, 2008 (JP) .............................. 2008-309788
Jan. 20, 2009 (JP) .............................. 2009-009761
Jun. 4, 2009 (JP) .............................. 2009-135143
Sep. 24, 2009 (JP) .............................. 2009-219783

(51) Int. Cl.
*F21V 7/04* (2006.01)

(52) U.S. Cl. .......................... 362/615; 362/623; 362/626

(58) Field of Classification Search ................. 362/615, 362/623, 626, 296.01, 297, 298, 307, 296.09
See application file for complete search history.

(56) References Cited

U.S. PATENT DOCUMENTS 6,992,335 B2 * 1/2006 Ohkawa .......................... 257/98

* cited by examiner

*Primary Examiner* — Vip Patel
(74) *Attorney, Agent, or Firm* — Adams & Wilks

(57) ABSTRACT

Provided is an illuminating device including a plurality of light sources. Micro prisms are provided in an opposed surface of a light guide plate. Each of the micro prisms is provided so that a reflective surface has a bottom side located at substantially 90 degrees with respect to an optical path of a beam from any one of the light sources. In a display device including a liquid crystal panel illuminated by the illuminating device, at least two micro prisms are provided in each area overlapped with aperture portions of the liquid crystal panel.

18 Claims, 6 Drawing Sheets

ILLUMINATING DEVICE AND DISPLAY DEVICE HAVING THE SAME

BACKGROUND OF THE INVENTION

1. Field of the Invention

The present invention relates to a display device used for a portable information device such as a mobile phone or a mobile computer, and an illuminating device used for the display device.

2. Description of the Related Art

Up to now, there has been used a liquid crystal display device which is small in size and thin in thickness and has low power consumption as a color image display device for most of portable information devices such as mobile phones or mobile computers.

The liquid crystal display device includes an illuminating device. An edge-light type has been widely known as the type of the illuminating device. In the edge-light type illuminating device, light from a light source is made incident on a side surface of a light guide plate and then emitted from an upper surface (hereinafter, referred to as light emission surface) of the light guide plate. The light source to be used is a point light source such as a cold-cathode tube or a light emitting diode (LED). A large number of groove portions or dot patterns are formed in a surface (hereinafter, referred to as opposed surface) opposite to the light emission surface of the light guide plate. Diffusion patterns having a light diffusion effect are formed in the light emission surface in many cases. A prism is formed in a light incident surface of the light guide plate (that is, surface which is opposed to light source and on which light from light source is made incident) and has a function of diffusing light from the point light source to cause surface emission. A material of the light guide plate which is to be used is a transparent resin such as polycarbonate (PC) or acrylic (PMMA), which has a higher refractive index than air. In general, a diffusion sheet or a prism sheet is provided on the light emission surface side of the light guide plate and a reflective sheet is provided under the light guide plate.

In order to specialize in the point light source such as the LED and maintain predetermined luminance even in a case where the prism sheet is not provided, the development of a light guide plate using a micro prism array has been advanced (see, for example, JP 2007-280952 A, FIG. 6).

A conventional illuminating device has limitations on thickness, luminance efficiency, and cost because of the use of the prism sheet. In the case of the micro prism array type illuminating device disclosed in JP 2007-280952 A, square pyramid diffusion patterns are fundamentally aligned in the same direction, and hence it is difficult to sufficiently use light from the point light source. The illuminating device has substantially the same luminance efficiency level as in the case where the prism sheet is used, and thus has a very low use efficiency of light from the light source.

The conventional micro prism array type illuminating device has only a single light source, and hence it is difficult to increase the number of light sources to two or more.

An illuminating device with a structure in which the prism sheet is not used has a problem that a moire fringe (interference) is more likely to occur in a case where a liquid crystal panel is mounted.

SUMMARY OF THE INVENTION

An illuminating device according to the present invention has a structure in which a plurality of light sources are provided and a plurality of micro-prisms are formed in an opposed surface opposite to a light emission surface of a light guide plate. Each of the micro-prisms has a reflective surface for reflecting beams from the light sources and a plurality of side surfaces other than the reflective surface. Each of the micro-prisms is provided so that the reflective surface has a bottom side located at an angle of substantially 90 degrees with respect to an optical path of a beam from any one of the plurality of light sources, and each of the side surfaces has a bottom side located at an angle other than 90 degrees with respect to optical paths of the beams from the plurality of light sources.

Then, the micro-prisms may have a triangular pyramid shape or a regular triangular pyramid shape and may have a height set to 1 μm to 10 μm. An angle formed between the reflective surface and bottom surface of each of the micro-prisms may be set to 40 degrees to 50 degrees. This can prevent each of the micro-prisms from including a plurality of bottom sides forming substantially 90 degrees with the beam from the light source, and each of the micro-prisms includes the single reflective surface. Therefore, an illuminating device having no luminance unevenness may be realized.

Alternatively, the reflective surface of each of the micro-prisms may be different in shape from the side surfaces other than the reflective surface, and hence each of the micro-prisms does not include the plurality of bottom sides forming substantially 90 degrees with the beam from the light source.

Alternatively, each of the micro-prisms may be formed into a shape in which two side surfaces sandwiching the reflective surface are curved to form a diffusion surface, and hence each of the micro-prisms does not include the plurality of bottom sides forming substantially 90 degrees with the beam from the light source.

Alternatively, each of the micro-prisms may include a projection formed on an opposite side of the reflective surface.

Longitudinal prisms may be formed in the light emission surface of the light guide plate perpendicularly to the light incident surface of the light guide plate. Therefore, the occurrence of a bright line of the illuminating device may be reduced.

The longitudinal prisms may be arranged with a vertex angle of 120 degrees to 170 degrees at a pitch of 15 μm to 100 μm. When the pitch is shortened, a moire fringe of the illuminating device may be prevented.

Alternatively, the light emission surface may be blast processed or provided with a diffusion layer. With this structure, the same effect as in the case where the longitudinal prisms are formed may be obtained.

Alternatively, the longitudinal prisms may be formed in the light emission surface of the light guide plate at a plurality of angles with respect to the light incident surface of the light guide plate so as to cross each other.

The light incident surface includes light incident portions each having a semicircular recess part, which is provided correspondingly to the light sources. Each of the micro-prisms may be provided so that the bottom side of the reflective surface is perpendicular to the optical paths of the beams from the light incident portions. When the light incident portions are formed into such a shape, the beams from the light sources may reach an end portion of the light guide plate.

Each of the light incident portions may include the plurality of semicircular recess parts which are formed adjacently to one another.

Alternatively, the odd number of semicircular-recess-parts are formed adjacently to one another in each of the light incident portions. A semicircular recess part located at the center is made larger than the other semicircular recess parts.

Alternatively, the light incident surface includes light incident portions each having a plurality of semicircular projected parts, which are provided correspondingly to the light sources, and each of the micro-prisms is provided so that the bottom side of the reflective surface is perpendicular to the optical paths of the beams from the light incident portions.

A display device according to the present invention includes a display element located over the light emission surface of the illuminating device described above. The display element also includes aperture portions for transmitting an illumination beam. The micro-prisms are provided so that a pitch of centers of the micro-prisms is equal to one of a pitch of the aperture portions and a value equal to or smaller than ½ of the pitch of the aperture portions. With this structure, a luminance difference between the dots of a liquid crystal panel may be reduced to prevent the occurrence of the moire fringe.

According to the present invention, an illuminating device which is very high in light source use efficiency, low in cost, and thin in thickness may be realized. The illuminating device may be applied to the case of the plurality of light sources. When the illuminating device is combined with the liquid crystal panel, a display device in which the moire fringe does not occur may be realized.

DETAILED DESCRIPTION OF THE PREFERRED EMBODIMENTS

Figure 1:
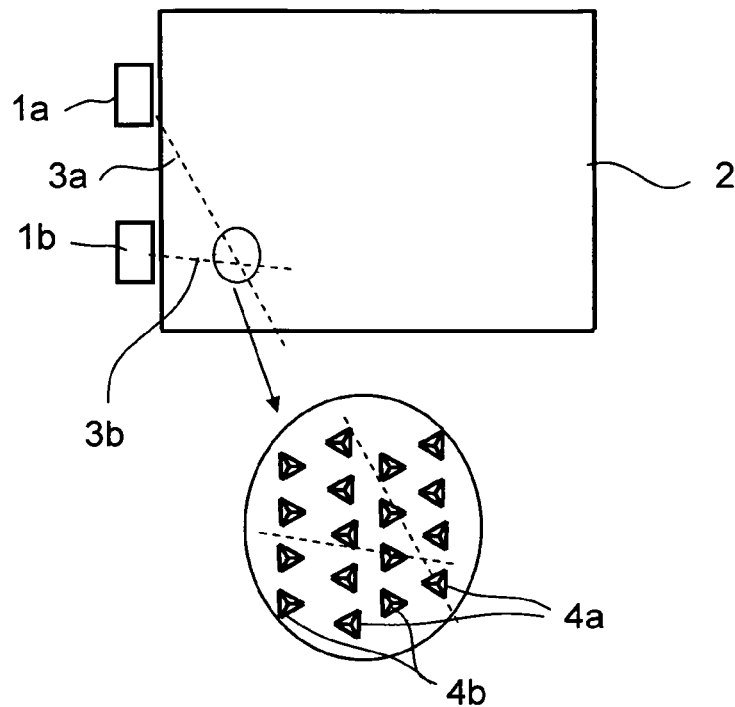
FIG. 1 is a schematic top view illustrating an illuminating device according to the present invention.

An illuminating device according to the present invention is described with reference to FIG. 1. FIG. 1 is a schematic top view illustrating the structure of the illuminating device of the present invention. As illustrated in FIG. 1, a plurality of light sources 1a and 1b are opposed to the light incident surface of the light guide plate 2. The beams emitted from the light sources 1a and 1b propagate through an inside of the light guide plate 2 and then is emitted from a light emission surface.

A plurality of micro-prisms are formed in an opposed surface opposite to a light emission surface of a light guide plate 2. Each of the micro-prisms has one reflective surface for reflecting beams from the light sources and a plurality of side surfaces other than the reflective surface. The reflective surface has a bottom side located at an angle of substantially 90 degrees with respect to an optical path of a beam from any one of the plurality of light sources. And each of the side surfaces has a bottom side located at an angle other than 90 degrees with respect to optical paths of the beams from the plurality of light sources.

That is, as showed in FIG. 1, an infinite number of micro-prisms 4a and 4b are formed in a surface opposed to the light emission surface of the light guide plate 2. The micro-prisms 4a and the micro-prisms 4b correspond to the light source 1a and the light source 1b, respectively. The micro-prisms 4a and the micro-prisms 4b are alternately arranged. Each of the micro-prisms 4a and 4b is formed into a regular triangular pyramid shape and includes a reflective surface for reflecting the beams from the light sources. In this embodiment, the surface for reflecting the beams from the light sources is assumed as the reflective surface of the micro prism. The micro-prisms 4a and the micro-prisms 4b are arranged such that the orientations of the reflective surfaces are changed according to positions when viewed from front. In a case where a straight line joining the light source 1a with the micro prism 4a is assumed as an optical path 3a, a bottom side of the reflective surface of the micro prism 4a is provided at approximately 90 degrees with respect to the optical path 3a. In a case where a straight line joining the light source 1b with the micro prism 4b is assumed as an optical path 3b, a bottom side of the reflective surface of the micro prism 4b is provided at approximately 90 degrees with respect to the optical path 3b.

When the micro-prisms are arranged as described above, the beams emitted from the plurality of light sources are reflected on the reflective surfaces of the micro-prisms corresponding to the respective light sources and emitted from the light emission surface of the light guide plate 2 in a perpendicular direction. Therefore, light use efficiency may be improved.

Here, the micro-prisms may be formed into a concave shape in the opposed surface of the light guide plate or a convex shape in the opposed surface of the light guide plate. The micro-prisms may have a triangular pyramid shape or a triangular truncated pyramid shape in the figure. But the shapes of the micro-prisms are not limited thereto in case that each of the micro-prisms does not include a plurality of bottom sides forming substantially 90 degrees with respect to the beam from the light source. For example, the reflective surface of each of the micro-prisms may be formed different in shape from the side surfaces other than the reflective surface. The side surfaces other than the reflective surface may be curved. A projection may be provided on an opposite side of the reflective surface. With the structures described above, when a beam incident on the light guide plate from the light source is reflected on the micro prism and emitted from the light emission surface of the light guide, the light use efficiency may be maximized.

Further, the light emission surface of the light guide plate may be processed to have a diffusion function. The light emission surface may be provided with longitudinal prisms or a diffusion layer or may be blast processed. When the light emission surface is processed as described above, a bright line of the illuminating device may be reduced.

Hereinafter, an illuminating device and a display device according to the present invention are specifically described with reference to the attached drawings.

Embodiment 1

Figure 2:
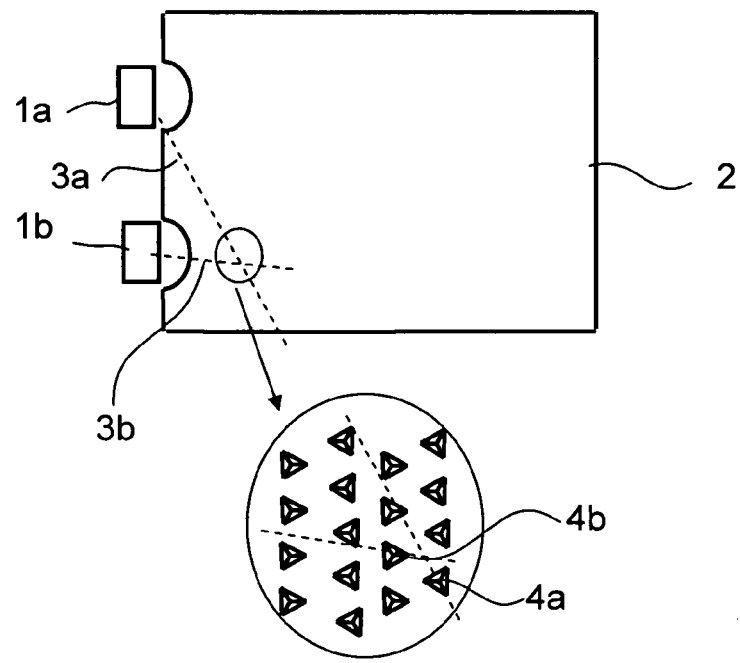
FIG. 2 is a schematic top view illustrating a structure of an illuminating device according to the present invention.

A structure of an illuminating device according to Embodiment 1 is described with reference to figures. FIG. 2 is a schematic top view illustrating the structure of the illuminating device according to Embodiment 1. A light guide plate 2 for guiding beams emitted from light sources 1a and 1b is provided in front of the light sources 1a and 1b. Light incident portions each having a semicircular recess part are formed correspondingly to the light sources 1a and 1b in a light incident surface of the light guide plate 2. The beams emitted from the light sources 1a and 1b propagate through an inside of the light guide plate 2 which is transparent and then is emitted from a light emission surface corresponding to a liquid crystal side surface to a liquid crystal panel side. The light sources 1a and 1b are opposed to the light incident surface of the light guide plate 2.

An infinite number of micro-prisms 4a and 4b are formed in a surface opposed to the light emission surface of the light guide plate 2. The micro-prisms 4a and the micro-prisms 4b correspond to the light source 1a and the light source 1b, respectively. The micro-prisms 4a and the micro-prisms 4b are alternately arranged. Each of the micro-prisms 4a and 4b is formed into a regular triangular pyramid shape and includes a reflective surface for reflecting the beams from the light sources. In this embodiment, the surface for reflecting the beams from the light sources is assumed as the reflective surface of the micro prism. The micro-prisms 4a and the micro-prisms 4b are arranged such that the orientations of the reflective surfaces are changed according to positions when viewed from front. In a case where a straight line joining the light source 1a with the micro prism 4a is assumed as an optical path 3a, a bottom side of the reflective surface of the micro prism 4a is provided at approximately 90 degrees with respect to the optical path 3a. In a case where a straight line joining the light source 1b with the micro prism 4b is assumed as an optical path 3b, a bottom side of the reflective surface of the micro prism 4b is provided at approximately 90 degrees with respect to the optical path 3b.

When the micro-prisms are arranged as described above, the beams emitted from the plurality of light sources are reflected on the reflective surfaces of the micro-prisms corresponding to the respective light sources and emitted from the light emission surface of the light guide plate 2 in a perpendicular direction. Therefore, light use efficiency may be improved. In this embodiment, the number of light sources is two. Even in a case where the three or more light sources are used, when the micro-prisms are arranged correspondingly to the respective light sources, the same function as in this embodiment may be obtained.

Figure 3:
FIG. 3 is a schematic perspective view illustrating a prism used in the illuminating device of the present invention.

FIG. 3 is an enlarged perspective view illustrating a structure of a prism 4 (4a or 4b) in this embodiment. The micro prism 4 has the regular triangular pyramid shape and is approximately 1 μm to 10 μm in height. An angle formed between a straight line joining a bottom side with a vertex and a bottom surface is approximately 40 degrees to 60 degrees. When the micro prism 4 has the triangular pyramid shape as in this embodiment, the micro prism does not include a plurality of bottom sides formed at 90 degrees with respect to the optical path but include only the single reflective surface. Therefore, an illuminating device having no luminance unevenness may be realized.

Figure 4:
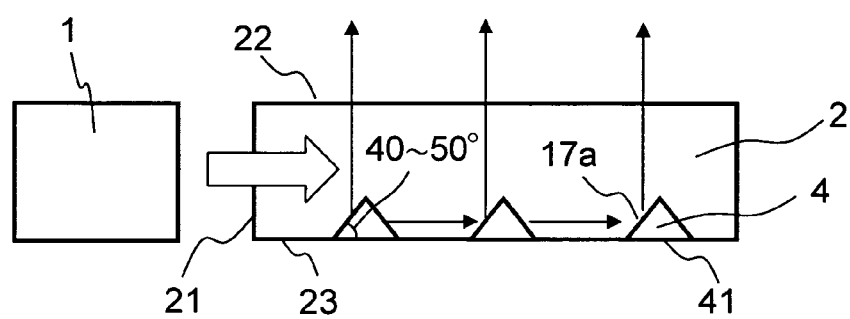
FIG. 4 is a schematic cross sectional view illustrating the structure of the illuminating device according to the present invention.

FIG. 4 is a cross sectional view illustrating the illuminating device according to this embodiment. The beam from the light source 1 (1a or 1b) is incident on the light guide plate 2 through the light incident surface 21, reflected on the reflective surface of the micro prism 4, and perpendicularly emitted from the light emission surface 22. The micro prism 4 is formed into a concave shape in the opposed surface 23 of the light guide plate 2. The beam reaching the micro prism 4 is not entirely reflected on the reflective surface 17a and emitted from the light emission surface 22. A part of the beam passes through the reflective surface 17a of the micro prism 4, is refracted by a side surface other than the reflective surface of the micro prism 4, and is made incident on the light guide plate 2 again. In this case, an angle formed between the side surface other than the reflective surface and the bottom surface 41 is preferably made equal to an angle formed between the reflective surface 17a and the bottom surface 41. In this embodiment, the angle formed between the reflective surface and the bottom surface is approximately 45 degrees. So, in this embodiment, the bottom surface 41 of the micro prism 4 is a virtual surface which is an extension of the opposed surface 23 of the light guide plate because the micro prism 4 is formed into a concave shape in the opposed surface 23.

Hereinafter, examples of shape of micro-prism which can apply to an illuminating device in the present invention are described with reference to the attached drawings.

Example 1

Figure 7A:
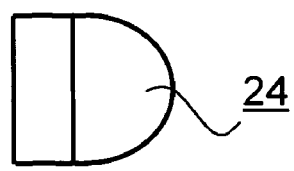
FIGS. 7A and 7B are schematic top views illustrating prisms used in the illuminating device of the present invention.
Figure 7B:
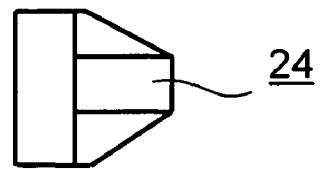

Micro-prisms in this example are schematically shown in FIGS. 7A and 7B. Each of micro-prisms 24 in this embodiment has a reflective surface and the other side surfaces. The reflective surface is different in shape from the other side surfaces. The micro prism 24 illustrated in FIG. 7A has a shape of a combination of a rectangle and a semicircle when viewed from top. A side surface corresponding to each of the short-sides of the rectangle is a right triangle and a bottom angle thereof is 45 degrees. A side surface corresponding to a long side of the rectangle is a square sloped surface and serves as the reflective surface of the micro prism 24. A beam from the light source 1 is reflected on the reflective surface and emitted from the light emission surface of the light guide plate. The micro prism 24 illustrated in FIG. 7B has, when viewed from top, a shape in which a first rectangle and a second rectangle are arranged, a short side of the second rectangle is located in a longitudinal direction of the first rectangle, and two trapezoids are arranged so as to sandwich the second rectangle. A side surface corresponding to each of the short sides of the first rectangle is a right triangle and a bottom angle thereof is 45 degrees. A side surface corresponding to a long side of the first rectangle is a square sloped surface and serves as the reflective surface of the micro prism 24. A beam from the light source is reflected on the reflective surface and emitted from the light emission surface. As described above, each of the micro-prisms 24 illustrated in FIGS. 7A and 7B has the reflective surface and the other side surfaces, and the reflective surface is different in shape from the other side surfaces. In such a structure, a bottom side of the reflective surface of the micro prism forms an angle of substantially 90 degrees with respect to an optical path of a beam from any one of the plurality of light sources, but a bottom side of each of the side surfaces other than the reflective surface does not form an angle of 90 degrees with respect to any of optical paths of beams from the plurality of light sources. That is, each of the micro-prisms 24 illustrated in FIGS. 7A and 7B has only one reflective surface, and hence the luminance unevenness of the illuminating device may be prevented as in the case of the prism having the triangular pyramid shape.

Example 2

Figure 8A:
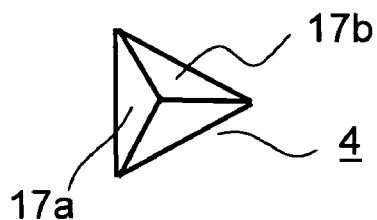
FIGS. 8A to 8C are schematic top views illustrating prisms used in the illuminating device of the present invention.
Figure 8B:
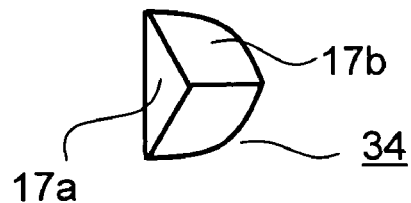
Figure 8C:
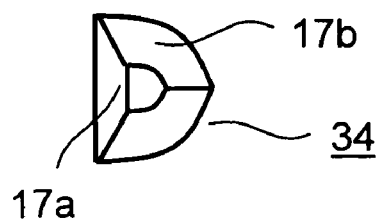

Next, micro-prisms in this example are described with reference to FIGS. 8A to 8C. FIG. 8A is corresponding to the micro prism 4 of Embodiment 1. FIGS. 8B and 8C are schematic top views illustrating micro-prisms 34 in this example. Each of the micro-prisms includes a reflective surface 17a for reflecting light from the light source and side surfaces other than the reflective surface 17a. In this embodiment, all the side surfaces are assumed as the diffusion surfaces 17b.

We already described that the micro prism 4 is formed into the triangular pyramid shape as illustrated in FIG. 8A, and hence only one bottom side forms the angle of 90 degrees with respect to the optical path. Therefore, the illuminating device having no luminance unevenness may be realized. In this example, as illustrated in FIGS. 8B and 8C, the side surfaces other than the reflective surface 17a of each of the micro-prisms 34 are curved. Therefore, even when the side surfaces are illuminated with beams depending on conditions such as LED arrangement positions and a light guide plate size, the beams are diffused by the curved surfaces, and hence the number of reflective surfaces of each of the micro-prisms 34 may be completely set to one. Thus, an illuminating device having very small luminance unevenness may be provided without the influence of the LED arrangement positions and the light guide plate size.

Specifically, in a case where the micro-prisms 34 have approximately 10 μm to 30 μm in bottom side length and approximately 3 μm to 5 μm in height, when a curvature radius R of each of the diffusion surfaces 17b is approximately 10 μm to 50 μm, a diffusion effect of the diffusion surfaces 17b is obtained. Even when the curvature radius R is set to a minus value to form a recess shape, the same effect is obtained. Each of the diffusion surfaces 17b is not limited to the curved surface. Even when an unevenness surface is formed by roughening, the same effect is obtained.

The micro prism 34 illustrated in FIG. 8B is a triangular pyramid in which the reflective surface 17a is flat and the other side surfaces are curved. The micro prism 34 illustrated in FIG. 8C is not the triangular pyramid but a triangular truncated pyramid having a shape in which a triangular pyramid portion corresponding to a vertex portion of the triangular pyramid is removed. The micro prism 34 having the triangular truncated pyramid shape is longer in bottom side length and lower in height than a triangular pyramid micro prism having the same reflection area. For example, even when a flat reflective surface is intended to be formed, in a case where micro-prisms are manufactured by chemical etching, a formed reflective surface is slightly curved. In such a case, when the bottom side length is short, the slightly curved surface also causes optical influence. When the height of the micro-prisms is high, the flow of a resin is inhibited by the micro-prisms during injection molding, and hence it is difficult to obtain a desired shape. Therefore, the micro prism 34 is formed into the triangular truncated pyramid shape, and hence a micro prism having a larger reflection area may be easily manufactured by even injection molding.

Example 3

FIGS. 9A to 9D are schematic top views illustrating micro-prisms in this example. Each of the micro-prisms 44 in this example has a tail-shaped or horn-shaped projection on an opposite side of a reflective surface. That is, when a micro prism is seen from a top, outer shape of the micro-prism is the form which the opposite side of the reflective surface projected in the shape of a tail. Even in this case, the reflective surface of each of the micro-prisms is assumed as the reflective surface 17a and side surfaces other than the reflective surface 17a are assumed as the diffusion surfaces 17b.

Figure 9A:
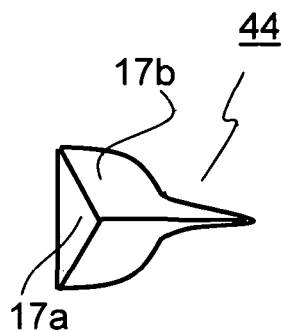
FIGS. 9A to 9D are schematic top views illustrating prisms used in the illuminating device of the present invention.

The micro prism 44 illustrated in FIG. 9A has a shape in which a horn-shaped projection is provided on an opposite side of the reflective surface 17a of the micro prism 34 illustrated in FIG. 8B, that is, on an extended line of a side extending from the vertex of the micro prism 34 in a direction opposite to the reflective surface 17a. Owing to the projection thus provided, an unevenness difference caused during injection molding is reduced to facilitate the filling of a resin. Therefore, the micro prism 44 is easily formed. The micro prism 44 illustrated in FIG. 9B has a shape in which a vertex portion corresponding to a connection point of any three of all sides of the micro prism 44 illustrated in FIG. 9A is cut. That is, the micro prism 44 illustrated in FIG. 9B has the reflective surface 17a and five curved side surfaces. Outer shapes of the five side surfaces are similar to an outer shape of the reflective surface 17a. When the shape as described in this example is employed, a prism size (height) of the micro prism 44 may be reduced. When the size of the micro prism 44 is reduced, the reliability of molding is improved and beams easily reach a deeper portion of the light guide plate, and hence light use efficiency may be improved.

Figure 9B:
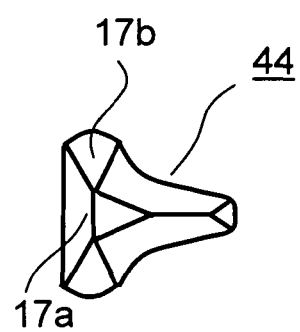
Figure 9C:
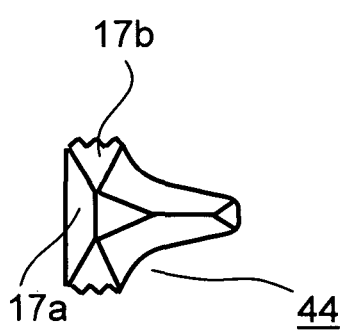

FIG. 9C illustrates the micro prism 44 in which the two diffusion surfaces 17b sandwiching the reflective surface 17a of the micro prism 44 illustrated in FIG. 9B are wave-shaped surfaces. When the diffusion surfaces are wave-shaped, a diffusion effect of the two diffusion surfaces 17b may be further improved.

Figure 9D:
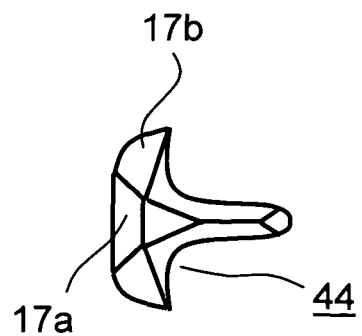

The micro prism 44 shown in FIG. 9D has a shape in which the two diffusion surfaces 17b sandwiching the reflective surface 17a of the micro prism illustrated in FIG. 9B are rotated toward the reflective surface 17a side. The outer shape of each of the two diffusion surfaces 17b is an anchor-like shape. When formed into the anchor-like shape, the two diffusion surfaces 17b sandwiching the reflective surface 17a approaches the reflective surface 17a, and hence a diffusion effect of the two diffusion surfaces 17b may be further improved.

A micro prism may be formed into a shape in which the horn-shaped projection of the micro prism 44 illustrated in FIG. 9B or 9C is removed. In this case, the projection is removed, and hence light is more likely to be reflected on a surface located on the opposite side of the reflective surface. When the projection is provided as in the case of the micro prism 44 illustrated in FIG. 9B or 9C, a luminance unevenness reduction effect by the micro prism may be improved.

Embodiment 2

Figure 5:
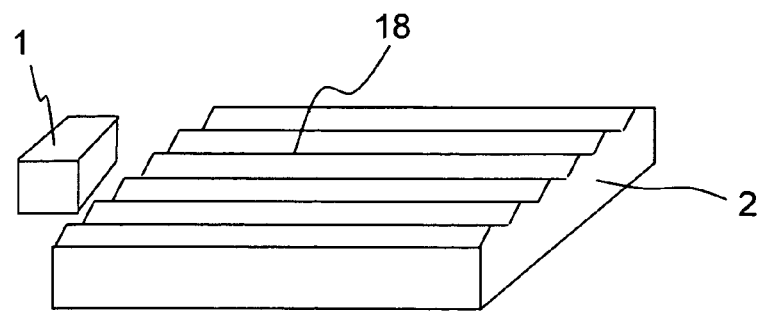
FIG. 5 is a schematic perspective view illustrating the structure of the illuminating device according to the present invention.
Figure 10A:
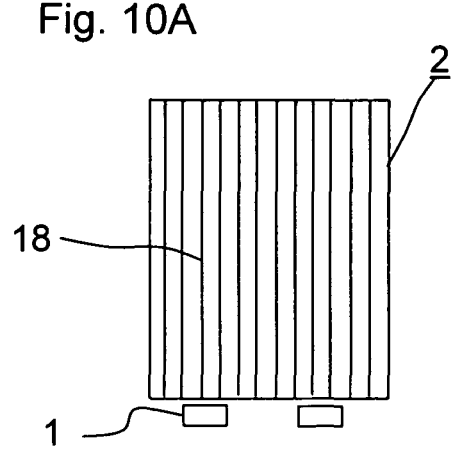
FIGS. 10A and 10B are schematic top views illustrating structures of the illuminating device according to the present invention.

FIG. 5 is a perspective view illustrating the structure of the illuminating device according to this embodiment and FIG. 10A is a top view. This embodiment is different from the embodiment 1 in the plurality of longitudinal prisms formed on the emitting surface of the light guide. Except for this point, the structure of the embodiment 1 is applicable for this embodiment. The beam incident on the light guide plate 2 from the light source 1 is guided through the inside of the light guide plate 2, reflected on the reflective surface of the micro prism 4, and emitted. A plurality of longitudinal prisms 18 are formed in the light emission surface in parallel to a traveling direction of the beam from the light source. The longitudinal prisms 18 are formed perpendicularly to the light incident surface of the light guide plate 2. An angle of a vertex of each of the longitudinal prisms 18 is approximately 120 degrees to 170 degrees. In order to prevent the occurrence of a moire fringe, it is preferable to set a pitch to a small value. In view of a manufacturing method, however, a limit of the pitch is approximately 15 μm to 100 μm. The illuminating device with the structure in which the prism sheet is not used as in the present invention is more likely to cause a phenomenon called a "bright line" which may be linearly observed from the light source 1 at any angle. When the longitudinal prisms 18 are arranged, the occurrence of the bright line may be reduced.

Even in the case where the longitudinal prisms 18 are not provided, when a part of or the entirety of the light emission surface is roughened by blasting or when a diffusion layer is formed by printing, the bright line reduction effect is obtained.

Figure 10B:
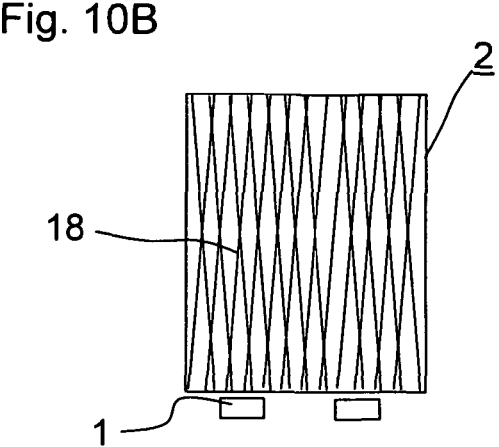

FIG. 10B is a schematic top view illustrating the light guide plate 2 having the longitudinal prisms arranged at two kinds of angles with respect to the light incident surface of the light guide plate. As showed in FIG. 10B, the longitudinal prisms 18 are arranged not in parallel but at two kinds of angles, and hence the longitudinal prisms 18 cross one another. When the longitudinal prisms 18 are arranged in parallel as in FIG. 10A, it is necessary to reduce the prism pitch to a very small value in order to prevent the moire fringe. The dot pitch of the liquid crystal panel is becoming very small, and hence the reduction of the longitudinal prism pitch according to the dot pitch is close to a processing limit. In the case where the longitudinal prisms 18 are arranged in parallel, even the slight displacement of the liquid crystal panel in angle with respect to the light guide plate may cause the moire fringe. As in FIG. 10B, the longitudinal prisms 18 are crossed to improve the diffusion effect. Therefore, even when the prism pitch is relatively large, an illuminating device for a display device in which the moire fringe is not caused may be provided. Even when the angle of the liquid crystal panel is displaced, it is unlikely to cause the moire fringe.

Even when the crossing angle of the longitudinal prisms 18 is approximately five degrees, there is obtained an effect of preventing the moire fringe. The crossing angle may be increased to 45 degrees in maximum. Even when the longitudinal prisms 18 are arranged at two or more kinds of angles, the same effect is obtained.

Embodiment 3

Figure 11A:
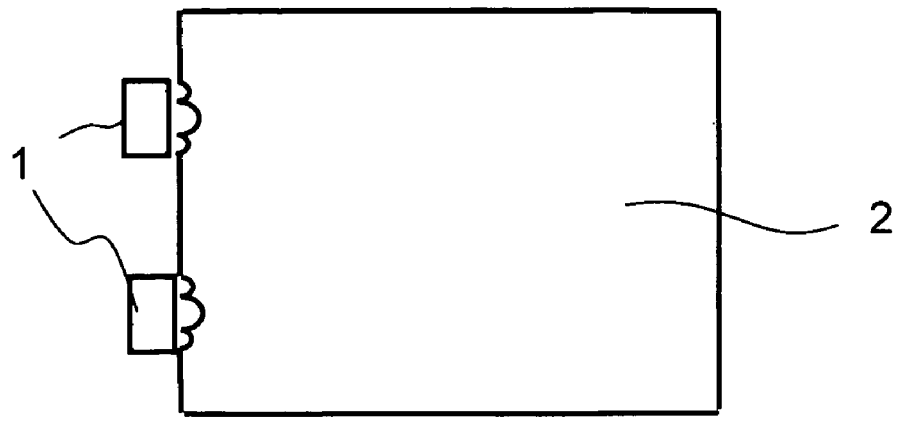
FIGS. 11A to 11C are schematic top views illustrating structures of the illuminating device according to the present invention.
Figure 11B:
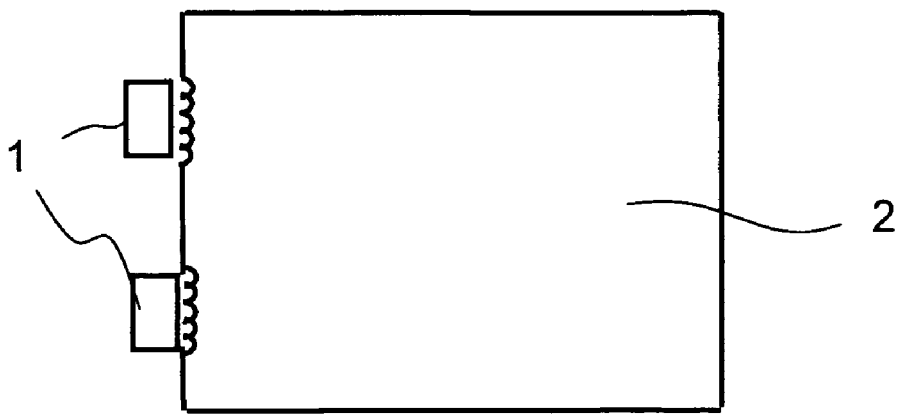
Figure 11C:
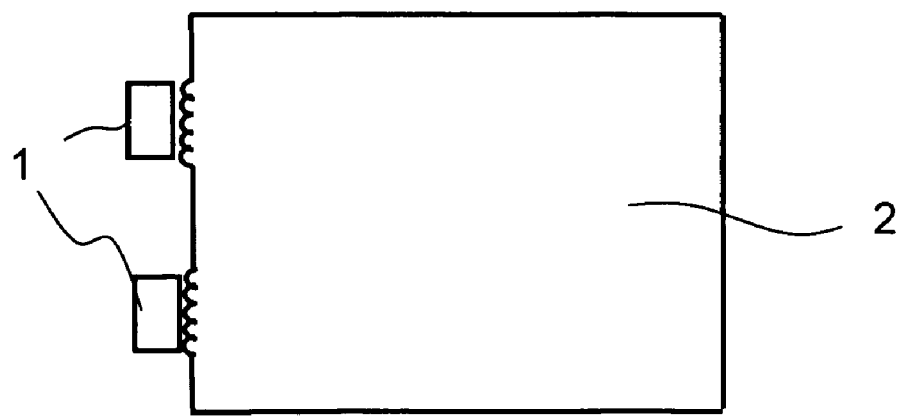

FIGS. 11A to 11C illustrate schematic structures of an illuminating device according to this embodiment. This embodiment is different from the embodiment 1 in the shape of the light incident portion. In the embodiments described above, each of the light incident portions has the single semicircular recess part. Each of the light incident portions illustrated in FIG. 10A has three small adjacent semicircular recess parts. A semicircle located at the center is made larger than semicircles located on both sides thereof. Therefore, an incident light loss of the light incident portion having the three adjacent semicircular recess parts may be reduced as compared with the light incident portion having the single large semicircular recess part. In addition, unevenness caused in the light incident portion, which is called an eye or a hot spot, may be eliminated.

When each of the light incident portions has five small adjacent semicircular recess parts as illustrated in FIG. 11B, a semicircle size is further reduced, and hence light use efficiency is improved. The number of semicircular recess parts is not limited to three and five. When two or more semicircular recess parts are arranged, the same performance as the light incident portion in this embodiment may be obtained. A suitable size of the semicircular recess parts and the suitable number of semicircular recess parts are changed depending on a light distribution and size of the light sources 1.

As illustrated in FIG. 11C, adjacent semicircular projected parts may be provided in each of the light incident portions. When the light incident portions are formed into the semicircular projected shape, the number of eyes may be reduced or light incident efficiency may be improved. As in the case of FIG. 11B, the number of semicircular projected parts is desirably equal to or larger than two. The suitable number of projected parts is changed depending on the light distribution and size of the light sources 1. However, when the semicircle size is too small, the diffusion effect is reduced or mold processing becomes difficult, and hence a semicircle diameter is desirably equal to or larger than 50 μm. In this embodiment, the plurality of semicircular-recess-parts or projected-parts is arranged in each of the light incident portions. Prisms may be provided in each of the light incident portions depending on the light distribution of the light sources 1. In this case, a prism pitch is preferably equal to or larger than 50 μm.

In addition, it cannot be overemphasized that the structure of the light incident portions in this embodiment is applicable to the embodiment 2.

Embodiment 4

Figure 6A:
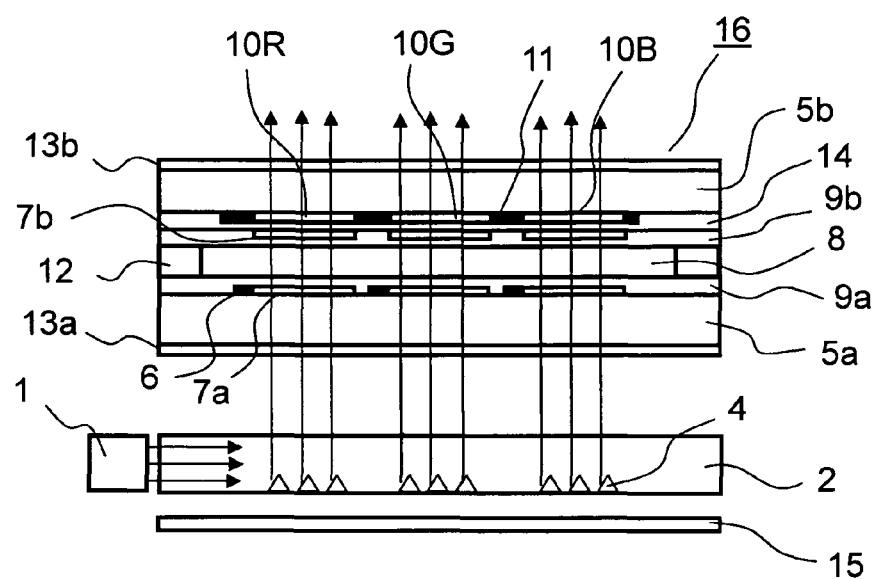
FIG. 6A is a schematic cross sectional view illustrating the structure of the display device according to the present invention and FIG. 6B illustrates a prism arrangement.

FIG. 6A schematically illustrates a structure of a display device according to this embodiment. The display device according to this embodiment includes the illuminating device described above and a liquid crystal panel 16 provided over the illuminating device. In this case, in order to reflect a beam leaked from the light guide plate 2 to be returned to the light guide plate 2, a reflective sheet 15 is provided on a rear surface side of the opposed surface of the light guide plate 2 of the illuminating device. As illustrated in FIG. 6A, the liquid crystal panel 16 has a structure in which a liquid crystal layer 8 is sealed between a glass substrate 5*a* and an opposed substrate 5*b*. Transparent electrodes 7*a* and TFT areas 6 are formed on the glass substrate 5*a*. A lower alignment film 9*a* is formed on the transparent electrodes 7*a*, TFT areas 6, and a part of the glass substrate 5*a*. On the other hand, a red color filter 10R, a green color filter 10G, and a blue color filter 10B are formed on the opposed substrate 5*b* opposed to the glass substrate 5*a*. A black matrix 11 is formed between the color filters. A region in which the respective color filters 10R, 10G, and 10B and the black matrix 11 are formed is planarized by a planarizing layer 14. Opposite electrodes 7*b* serving as pixels are opposed to the transparent electrodes 7*a* on the planarizing layer 14. An upper alignment film 9*b* is formed on the opposite electrodes 7*b* and a part of the planarizing layer 14. The glass substrate 5*a* and the opposed substrate 5*b* each having the surface structure described above are bonded to each other through a predetermined gap by a seal 12 so as to face the formed films thereof to each other. Though not illustrated, in order to make the gap uniform, beads with a predetermined particle diameter are dispersed inside the seal or between the substrates in many cases. The liquid crystal layer 8 is provided in the gap. An initial orientation of liquid crystal molecules of the liquid crystal layer 8 is regulated by the upper and lower alignment films 9*a* and 9*b*. A lower polarizing plate 13*a* is provided on a rear surface of the glass substrate 5*a*. An upper polarizing plate 13*b* is provided on a rear surface of the opposed substrate 5*b*. A pixel region of the liquid crystal panel 16 includes: regions which correspond to the black matrix 11 and the TFT areas 6 and cannot be used for display; and regions which can be used for display. In the present invention, the regions which can be used for display are assumed as aperture portions. The aperture portions correspond to respective dots (pixels) of the liquid crystal panel 16.

The respective aperture portions are illuminated with beams which are emitted from the light source 1 and reflected on the micro-prisms 4. Therefore, when the number of micro-prisms corresponding to one aperture portion is different from the number of micro-prisms corresponding to another aperture portion, a luminance difference is caused between the dots of the liquid crystal panel. The luminance difference is also caused in a case where a pitch of the aperture portions (dot pitch of liquid crystal panel) is different from an arrangement pitch of the micro-prisms 4 adjacent to the light guide plate 2. When the luminance difference is large, a phenomenon called a moire fringe or interference pattern occurs. Thus, the number of micro-prisms corresponding to one aperture portion is desirably made equal to the number of micro-prisms corresponding to another aperture portion. A pitch between the barycenters of the adjacent micro-prisms 4 may be made completely equal to the dot pitch of the liquid crystal panel 16 or made equal to or smaller than ½ the dot pitch of the liquid crystal panel 16.

Figure 6B:
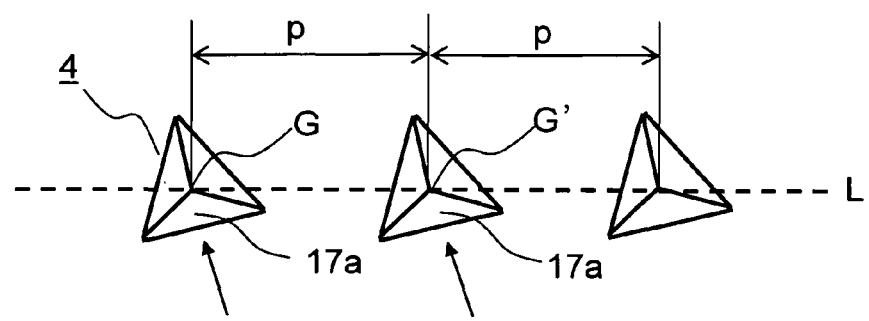

Hereinafter, the micro-prisms 4 arranged in the aperture portions illustrated in FIG. 6A are described in detail with reference to FIG. 6B. The respective prisms are arranged in the aperture portions such that the bottom sides of reflective surfaces 17a are perpendicular to optical paths (indicated by arrows in FIG. 6B) of beams from the respective corresponding light sources 1. The micro-prisms 4 corresponding to the aperture portions are arranged on a straight line L. In this embodiment, the micro-prisms are arranged in row. The micro-prisms may be arranged in column or matrix. In this case, when a distance between barycenter G (G') of the adjacent micro-prisms 4 is assumed as one pitch (=p), the respective micro-prisms corresponding to the aperture portions are arranged on the straight line at the same pitch. When the pitch of the plurality of arranged micro-prisms is completely equal to the dot pitch of the liquid crystal panel, only one micro prism is provided for each aperture portion (each dot of liquid crystal panel). When the pitch of the plurality of arranged micro-prisms is equal to or smaller than ½ the dot pitch of the liquid crystal panel, at least one micro prism is provided for each aperture portion (each dot of liquid crystal panel). When such an arrangement is employed, the number of micro-prisms corresponding to one aperture portion may be made equal to the number of micro-prisms corresponding to another aperture portion to reduce the luminance difference between the dots of the liquid crystal panel, to thereby prevent the occurrence of the moire fringe.

Further, the reflective sheet 15 is provided above the rear surface of the light guide plate 2, and hence light leaked from the opposed surface may be reflected to be returned to the light guide plate 2.

A light diffusion sheet may be provided between the light guide plate and a liquid crystal element (liquid crystal layer). The light diffusion sheet has a minute-unevenness-shaped surface or a surface applied with beads, and hence a light diffusion effect is obtained.

In each of the embodiments described above, the light source 1 is the point light source, and hence a side view type white LED is expected. However, a top view type or a shell type may be used or a color LED other than the white LED may be used. A white LED package in which a yellow phosphor is potted to a blue LED may be used as the light source 1 of the illuminating device. The light guide plate 2 is a molded item made of a transparent resin, and examples of the transparent resin may include Zeonor (cycloolefin polymer), PMMA, and PC.

What is claimed is:

1. An illuminating device comprising:
a light guide plate having a light incident surface and a light emission surface;
a plurality of light sources for emitting beams into the light guide plate through the light incident surface; and
a plurality of micro-prisms formed on an opposed surface located on an opposite side of the light emission surface; wherein
each of the plurality of micro-prisms has a reflective surface for reflecting the beams and a plurality of side surfaces other than the reflective surface, and wherein
the reflective surface has a bottom side located at an angle of 90 degrees with respect to an optical path of a beam from any one of the plurality of light sources, and each of the plurality of side surfaces has a bottom side located at an angle other than 90 degrees with respect to all optical paths of the beams from the plurality of light sources.

2. An illuminating device according to claim 1, wherein each of the plurality of micro-prisms is formed into a concave shape in the opposed surface.

3. An illuminating device according to claim 2, wherein each of the plurality of micro-prisms is a triangular pyramid shape.

4. An illuminating device according to claim 2, wherein the reflective surface of each of the plurality of micro-prisms is different in shape from the plurality of side surfaces.

5. An illuminating device according to claim 4, wherein the plurality of side surfaces of each of the plurality of micro-prisms are curved.

6. An illuminating device according to claim 5, wherein outer shape of each of the plurality of micro prisms is the form which the opposite side of the reflective surface projected in the shape of a tail.

7. An illuminating device according to claim 3, wherein a height of each of the plurality of micro-prisms is 1 μm to 10 μm and an angle formed between the reflective surface and a bottom surface of each of the plurality of micro-prisms is 40 degrees to 50 degrees.

8. An illuminating device according to claim 1, further comprising longitudinal prisms formed on the light emission surface, the longitudinal prisms are perpendicularly to the light incident surface.

9. An illuminating device according to claim 8, wherein the longitudinal prisms are arranged with a vertex angle of 120 degrees to 170 degrees at a pitch of 15 μm to 100 μm.

10. An illuminating device according to claim 1, further comprising longitudinal prisms formed on the light emission surface, the longitudinal prisms are arranged at two kinds of angles with respect to the light incident surface.

11. An illuminating device according to claim 1, wherein the light emission surface is blast processed.

12. An illuminating device according to claim 1, further comprising a diffusion layer formed on the light emission surface.

13. An illuminating device according to claims 1; wherein
the light incident surface comprises light incident portions each including a semicircular-recess-part, which are provided correspondingly to the plurality of light sources; and each of the plurality of micro-prisms is provided so that the bottom side of the reflective surface is perpendicular to the optical paths of the beams from the light incident portions.

14. An illuminating device according to claim 13, wherein each of the light incident portions includes a plurality of the semicircular-recess-parts which are formed adjacently to one another.

15. An illuminating device according to claim 14, wherein:
the odd number of semicircular-recess-parts are formed adjacently to one another; and
a plurality of the semicircular recess parts formed adjacently to one another, a semicircular recess part located at a center is larger than remaining semicircular recess parts.

16. An illuminating device according to claim 1; wherein
the light incident surface comprises light incident portions each including a plurality of semicircular projected parts, which are provided correspondingly to the plurality of light sources; and
each of the plurality of micro prisms is provided so that the bottom side of the reflective surface is perpendicular to the optical paths of the beams from the light incident portions.

17. A display device comprising:
a light guide plate having a light incident surface and a light emission surface;
a plurality of light sources for emitting beams into the light guide plate through the light incident surface;
a plurality of micro-prisms formed on an opposed surface located on an opposite side of the light emission surface; and
a display element located over the light emission surface and illuminated with illumination beams from the light emission surface, wherein each of the plurality of micro-prisms has a reflective surface for reflecting the beams from the plurality of light sources and a plurality of side surfaces other than the reflective surface, and wherein
the reflective surface has a bottom side located at an angle of 90 degrees with respect to an optical path of a beam from any one of the plurality of light sources, and each of the plurality of side surfaces has a bottom side located at an angle other than 90 degrees with respect to all optical paths of the beams from the plurality of light sources.

18. A display device according to claim 17; wherein the display element includes aperture portions for transmitting the illumination beam; and
the plurality of micro prisms are provided in the aperture portions so that a pitch of centers of the plurality of micro prisms is equal to one of a pitch of the aperture portions and a value equal to or smaller than ½ of the pitch of the aperture portions.

* * * * *